US009795272B2

(12) United States Patent
Boyer (10) Patent No.: US 9,795,272 B2
(45) Date of Patent: Oct. 24, 2017

(54) FILTER ASSEMBLY FOR A DISHWASHER APPLIANCE (71) Applicant: General Electric Company, Schenectady, NY (US)

(72) Inventor: Joel Charles Boyer, Louisville, KY (US)

(73) Assignee: HAIER US APPLIANCE SOLUTIONS, INC., Wilmington, DE (US)

( * ) Notice: Subject to any disclaimer, the term of this patent is extended or adjusted under 35 U.S.C. 154(b) by 214 days.

(21) Appl. No.: 14/722,700

(22) Filed: May 27, 2015

(65) Prior Publication Data

US 2016/0345798 A1 Dec. 1, 2016

(51) Int. Cl.
*A47L 15/42* (2006.01)
*B01D 29/56* (2006.01)
*B01D 29/03* (2006.01)
*B01D 29/58* (2006.01)
*B01D 29/64* (2006.01)

(52) U.S. Cl.
CPC ....... *A47L 15/4227* (2013.01); *A47L 15/4204* (2013.01); *A47L 15/4208* (2013.01); *B01D 29/56* (2013.01); *B01D 29/03* (2013.01); *B01D 29/58* (2013.01); *B01D 29/6476* (2013.01)

(58) Field of Classification Search
CPC . B01D 29/56; A47L 15/4204; A47L 15/4208; A47L 15/4227
See application file for complete search history.

(56) References Cited

U.S. PATENT DOCUMENTS

| 4,201,345 | A | * | 5/1980 | Ziegler | B02C 18/0092 241/46.012 |
| 6,314,642 | B1 | | 11/2001 | Thompson et al. | |
| 7,350,527 | B2 | | 4/2008 | Gurubatham et al. | |
| 8,714,167 | B2 | | 5/2014 | Yoon et al. | |
| 2013/0174879 | A1 | * | 7/2013 | Welch | A47L 15/4204 134/111 |

FOREIGN PATENT DOCUMENTS

CN 202991593 U 6/2013

* cited by examiner

*Primary Examiner* — Jason Ko
*Assistant Examiner* — Spencer Bell
(74) *Attorney, Agent, or Firm* — Dority & Manning, P.A.

(57) ABSTRACT

Filter assemblies for filtering wash fluid to be circulated by a circulation pump in a dishwasher appliance are provided. A filter assembly includes a first filter member, a second filter member, a first discharge blade, and a second discharge blade. The filter assembly further includes a shaft extending through the first filter member, the second filter member, a first central bore hole of the first discharge blade, and a second central bore hole of the second discharge blade. The shaft includes a body which has an outer surface, the outer surface including a first threaded portion, a second threaded portion, a first unthreaded portion, and a second unthreaded portion. The plurality of first inner threads mesh with the first threaded portion and the plurality of second inner threads mesh with the second threaded portion.

14 Claims, 7 Drawing Sheets

FILTER ASSEMBLY FOR A DISHWASHER APPLIANCE

FIELD OF THE INVENTION

The present subject matter relates generally to dishwasher appliances and more particularly to improved shafts for use in filter assemblies for dishwasher appliances.

BACKGROUND OF THE INVENTION

During wash and rinse cycles, dishwasher appliances generally circulate a fluid through a wash chamber over articles, such as pots, pans, silverware, etc. The fluid can be, e.g., various combinations of water and detergent during the wash cycle, or water (which may include additives) during the rinse cycle. Typically, the fluid is circulated during a given cycle using a pump. Fluid is collected at or near the bottom of the wash chamber and pumped back into the wash chamber through, e.g., nozzles in spray arms and other openings that direct the fluid against the articles to be cleaned or rinsed.

Depending upon the level of soil on the articles, fluids used during wash and rinse cycles can become contaminated with soils in the form of debris or particles that are carried with the fluid. In order to protect the pump and recirculate the fluid through the wash chamber, it is beneficial to filter the fluid so that relatively clean fluid is applied to the articles in the wash chamber and soils are removed or reduced from the fluid supplied to the pump.

Accordingly, some dishwasher appliances are generally provided with a filter assembly to trap at least certain of the soils carried with the wash fluid. Such filter assemblies generally include a coarse filter and a fine filter in a parallel flow configuration. For example, during a wash cycle a portion of the recirculated wash fluid may pass through the coarse filter and a portion of the recirculated wash fluid may pass through the fine filter. Through the coarse of the wash cycle, it is expected that substantially all of the wash fluid will pass through the fine filter, such that eventually all soils larger than a maximum predetermined size (i.e, a size of soils filtered by the fine filter) are removed from the wash fluid.

One issue with such parallel configurations of coarse and fine filters is that during shortened cycles or due to other factors, some soils may not necessarily encounter both sizes of filter. Accordingly, some soils, such as soils small enough to pass through the coarse filter but large enough to be trapped by fine filter, may remain in the wash fluid. Further, larger soils may clog the fine filter if they are trapped by the fine filter before encountering the coarse filter.

Accordingly, improved filter assemblies have been provided for use in dishwasher appliances which utilize a series arrangement of filters, in which the wash fluid progressively flows through filters have smaller and smaller holes. Additionally, blades may be provided adjacent the filters to generally unclog soil from the filters and guide the soil towards discharge areas. It is generally desirable for these blades to be in close proximity to respective filters to facilitate such cleaning.

In order to provide such blades in close proximity to respective filters, the blades are connected to a threaded shaft. Further, setpoints, washers, or other suitable components may additionally be connected to the threaded shaft to locate the blades relative to the respective filters. However, such approach to locating the blades has a number of disadvantages. For example, locating of the setpoints, washers, etc. is prone to user error, which may impact the locations of the associated blades. Additionally, the setpoints, washers, etc. can move along the shaft during operation, thus causing additional movement along the shaft of the associated blades. Further, assembly of these components is generally relatively inefficient and difficult.

Accordingly, improved filter assemblies and associated shafts are desired. In particular, filter assemblies and shafts which provide improved, accurate and repeatable locating of associated blade assemblies relative to associated filters, as well as ease of assembly, would be advantageous.

BRIEF DESCRIPTION OF THE INVENTION

Aspects and advantages of the invention will be set forth in part in the following description, or may be apparent from the description, or may be learned through practice of the invention.

In accordance with one embodiment, a filter assembly for filtering a wash fluid to be circulated by a circulation pump in a dishwasher appliance is provided. The filter assembly defines an axial direction and includes a first filter member including a first filter panel, and a second filter member including a second filter panel, the second filter panel spaced from the first filter panel along the axial direction and configured in series flow with the first filter panel such that the wash fluid is filtered by the first filter panel and by the second filter panel prior to being recirculated by the circulation pump. The filter assembly further includes a first discharge blade positioned adjacent the first filter panel, the first discharge blade defining a first central bore hole and including a plurality of first inner threads that define the first central bore hole. The filter assembly further includes a second discharge blade positioned adjacent the second filter panel, the second discharge blade defining a second central bore hole and including a plurality of second inner threads that define the second central bore hole. The filter assembly further includes a shaft extending through the first filter member, the second filter member, the first central bore hole and the second central bore hole. The shaft includes a body which has an outer surface, the outer surface including a first threaded portion, a second threaded portion, a first unthreaded portion between the first threaded portion and the second threaded portion, and a second unthreaded portion positioned such that the second threaded portion is between the first unthreaded portion and the second unthreaded portion. The plurality of first inner threads mesh with the first threaded portion and the plurality of second inner threads mesh with the second threaded portion.

In accordance with another embodiment, a dishwasher appliance defining a vertical direction is provided. The dishwasher appliance includes a tub defining a wash chamber, a sump positioned at a bottom portion of the tub along the vertical direction, and a circulation pump for circulating a wash fluid in the sump to the wash chamber. The dishwasher appliance further includes a filter assembly disposed within the sump and in flow communication with the circulation pump. The filter assembly defines an axial direction and includes a first filter member including a first filter panel, and a second filter member including a second filter panel, the second filter panel spaced from the first filter panel along the axial direction and configured in series flow with the first filter panel such that the wash fluid is filtered by the first filter panel and by the second filter panel prior to being recirculated by the circulation pump. The filter assembly further includes a first discharge blade positioned adjacent the first filter panel, the first discharge blade defining a first central bore hole and including a plurality of first inner threads that define the first central bore hole. The filter assembly further includes a second discharge blade positioned adjacent the second filter panel, the second discharge blade defining a second central bore hole and including a plurality of second inner threads that define the second central bore hole. The filter assembly further includes a shaft extending through the first filter member, the second filter member, the first central bore hole and the second central bore hole. The shaft includes a body which has an outer surface, the outer surface including a first threaded portion, a second threaded portion, a first unthreaded portion between the first threaded portion and the second threaded portion, and a second unthreaded portion positioned such that the second threaded portion is between the first unthreaded portion and the second unthreaded portion. The plurality of first inner threads mesh with the first threaded portion and the plurality of second inner threads mesh with the second threaded portion.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", "third" and "fourth" may be used interchangeably to distinguish one component from another and are not intended to signify location or importance of the individual components.

Figure 1:
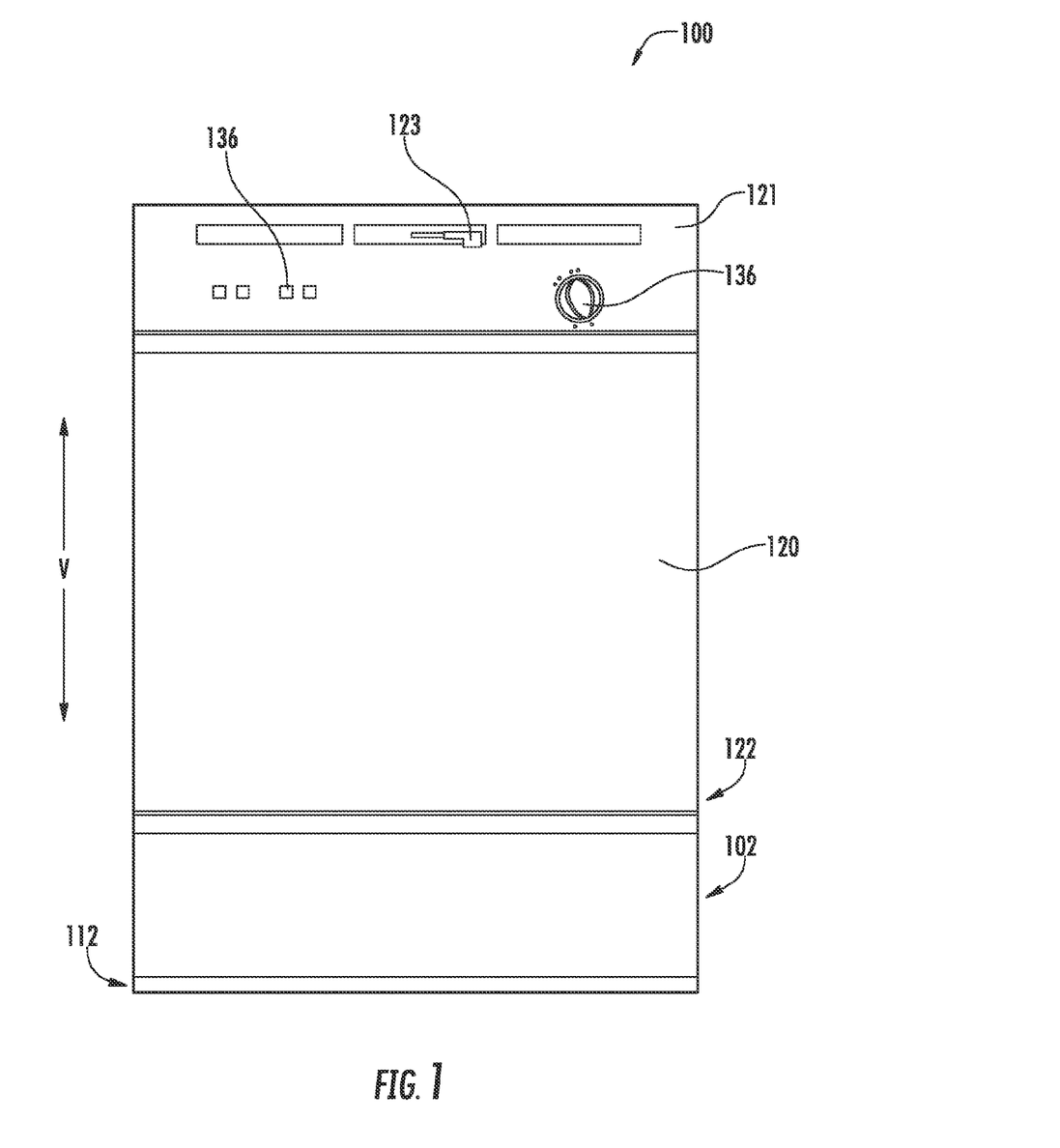
FIG. 1 provides a front elevation view of a dishwasher appliance in accordance with one embodiment of the present disclosure.
Figure 2:
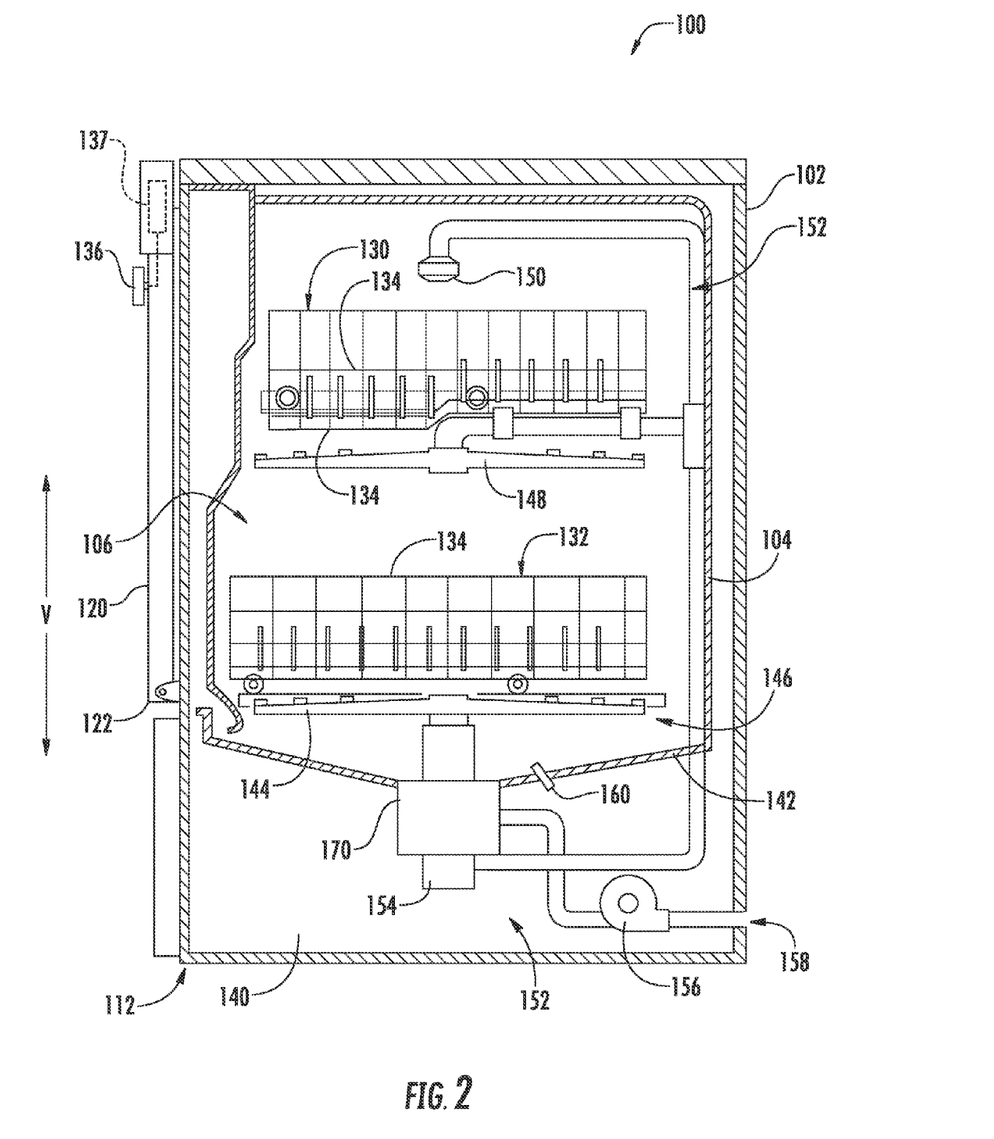
FIG. 2 provides a side, sectional view of a dishwasher appliance in accordance with one embodiment of the present disclosure.

FIGS. 1 and 2 depict a dishwasher appliance 100 according to an exemplary embodiment of the present subject matter. FIG. 1 provides a front view of the exemplary dishwasher appliance 100, and FIG. 2 provides a side, sectional view of the exemplary dishwasher appliance 100.

As shown, dishwasher appliance 100 defines a vertical direction V and includes a cabinet 102. Cabinet 102 has a tub 104 therein that defines a wash chamber 106. The tub 104 also defines a front opening (not shown). Dishwasher appliance 100 includes a door 120 hinged at a bottom 122 of door 120 for movement between a normally closed, vertical position (shown in FIGS. 1 and 2), wherein wash chamber 106 is sealed shut for washing operation, and a horizontal, open position for loading and unloading of articles from dishwasher appliance 100. A latch 123 is used to lock and unlock door 120 for access to wash chamber 106. Tub 104 also includes a sump assembly 170 shown schematically positioned adjacent a bottom portion 112 of tub 104 and configured for receipt of a liquid wash fluid (e.g., water, detergent, wash fluid, and/or any other suitable fluid) during operation of dishwasher appliance 100. More particularly, sump assembly 170 is shown attached to a bottom wall 142 of tub 104. As will be explained in greater detail below, the exemplary dishwasher appliance 100 may further include a filter assembly (not shown), such as a filter assembly 204 (see FIG. 3), disposed within sump assembly 170.

A spout 160 is positioned adjacent sump assembly 170 of dishwasher appliance 100. Spout 160 is configured for directing liquid into sump assembly 170. Spout 160 may receive liquid from, e.g., a water supply (not shown) or any other suitable source. In alternative embodiments, spout 160 may be positioned at any suitable location within dishwasher appliance 100, e.g, such that spout 160 directs liquid into tub 104. Spout 160 may include a valve (not shown) such that liquid may be selectively directed into tub 104. Thus, for example, during the cycles described below, spout 160 may selectively direct water and/or wash fluid into sump assembly 170 as required by the cycle of dishwasher appliance 100.

Rack assemblies 130 and 132 are slidably mounted within wash chamber 106. Each of the rack assemblies 130 and 132 is fabricated into lattice structures including a plurality of elongated members 134. Each rack of the rack assemblies 130 and 132 is adapted for movement between an extended loading position (not shown) in which the rack is substantially positioned outside the wash chamber 106, and a retracted position (shown in FIGS. 1 and 2) in which the rack is located inside the wash chamber 106. A silverware basket (not shown) may be removably attached to rack assembly 132 for placement of silverware, utensils, and the like, that are otherwise too small to be accommodated by the racks 130 and 132.

Dishwasher appliance 100 further includes a lower spray assembly 144 that is rotatably mounted within a lower region 146 of the wash chamber 106 and above sump assembly 170 so as to rotate in relatively close proximity to rack assembly 132. A mid-level spray assembly 148 is located in an upper region of the wash chamber 106 and may be located in close proximity to upper rack 130. Additionally, an upper spray assembly 150 may be located above the upper rack 130.

The lower and mid-level spray assemblies 144 and 148 and the upper spray assembly 150 are fed by a fluid circulation assembly 152 for circulating water and/or dishwasher fluid (collectively, "wash fluid") in the tub 104. Fluid circulation assembly 152 may include a wash or circulation pump 154 and a cross-flow/drain pump 156 located in a machinery compartment 140 located below sump assembly 170 of the tub 104, as generally recognized in the art. Cross-flow/drain pump 156 is configured for urging wash fluid within sump assembly 170 out of tub 104 and dishwasher appliance 100 to a drain 158. Circulation pump 154 is configured to provide a flow of recirculated wash fluid to tub 104 and wash chamber 106. More particularly, circulation pump 154 is configured for supplying a flow of wash fluid from sump assembly 170 to spray assemblies 144, 148 and 150 via a plurality of circulation conduits (not labeled).

Each spray assembly 144 and 148 includes an arrangement of discharge ports or nozzles for directing wash fluid onto dishes or other articles located in rack assemblies 130 and 132. The arrangement of the discharge ports in spray assemblies 144 and 148 provides a rotational force by virtue of wash fluid flowing through the discharge ports. The resultant rotation of the lower spray assembly 144 provides coverage of dishes and other dishwasher contents with a spray of wash fluid.

Dishwasher appliance 100 is further equipped with a controller 137 (shown in phantom) to regulate operation of the dishwasher appliance 100. Controller 137 may include a memory and microprocessor, such as a general or special purpose microprocessor operable to execute programming instructions or micro-control code associated with a cleaning cycle. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 137 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Controller 137 may be positioned in a variety of locations throughout dishwasher appliance 100. In the illustrated embodiment, controller 137 may be located within a control panel area 121 of door 120 as shown. In such an embodiment, input/output ("I/O") signals may be routed between the control system and various operational components of dishwasher appliance 100 along wiring harnesses that may be routed through the bottom 122 of door 120. Typically, controller 137 includes a user interface 136 through which a user may select various operational features and modes and monitor progress of the dishwasher appliance 100. In one embodiment, user interface 136 may represent a general purpose I/O ("GPIO") device or functional block. Additionally or alternatively, user interface 136 may include input components, such as one or more of a variety of electrical, mechanical or electro-mechanical input devices including rotary dials, push buttons, and touch pads. User interface 136 may include a display component, such as a digital or analog display device designed to provide operational feedback to a user. User interface 136 may be in communication with controller 137 via one or more signal lines or shared communication busses.

It should be appreciated that the subject matter disclosed herein is not limited to any particular style, model or configuration of dishwasher appliance, and that the embodiment depicted in FIGS. 1 and 2 is for illustrative purposes only. For example, instead of the racks 130 and 132 depicted in FIG. 1, dishwasher appliance 100 may be of a known configuration that utilizes drawers that pull out from the cabinet and are accessible from the top for loading and unloading of articles.

Figure 3:
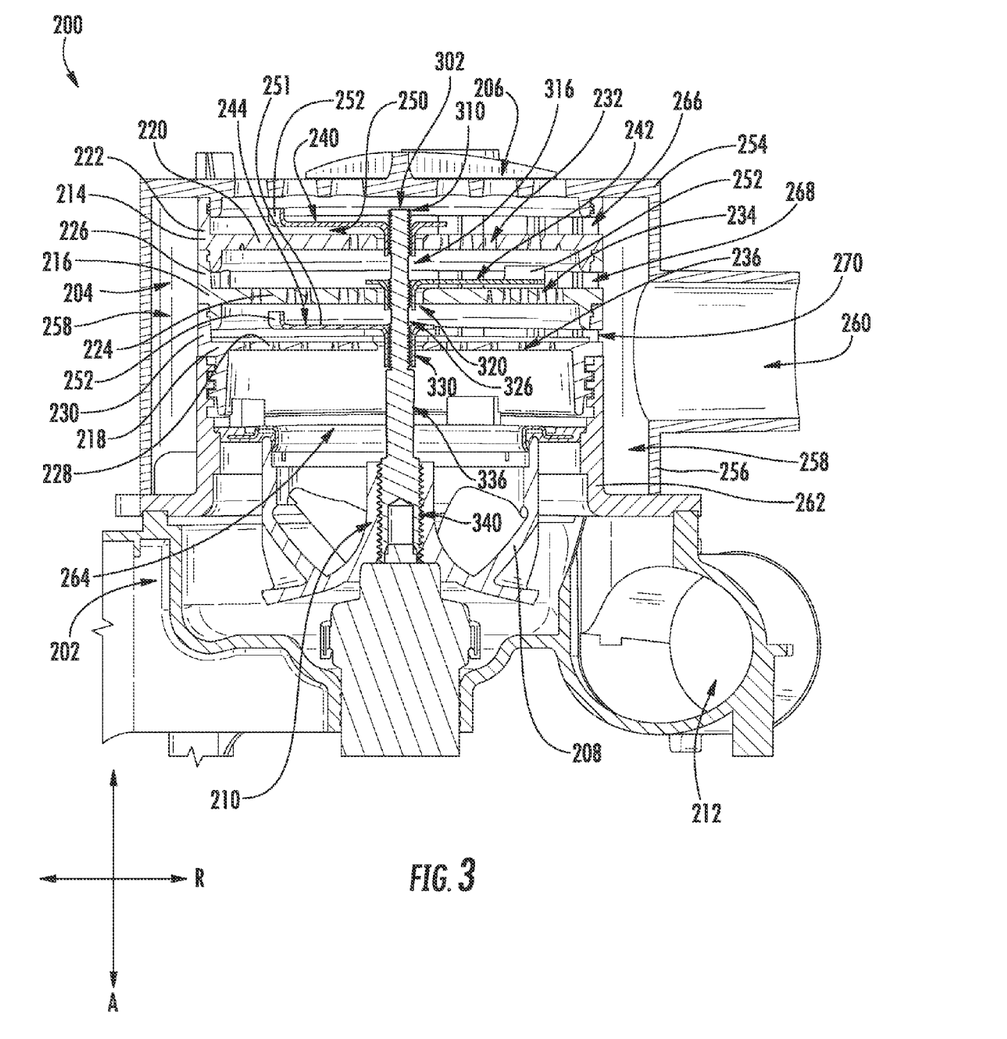
FIG. 3 provides a side, cross-sectional view of a sump and circulation pump in accordance with one embodiment of the present disclosure.
Figure 4:
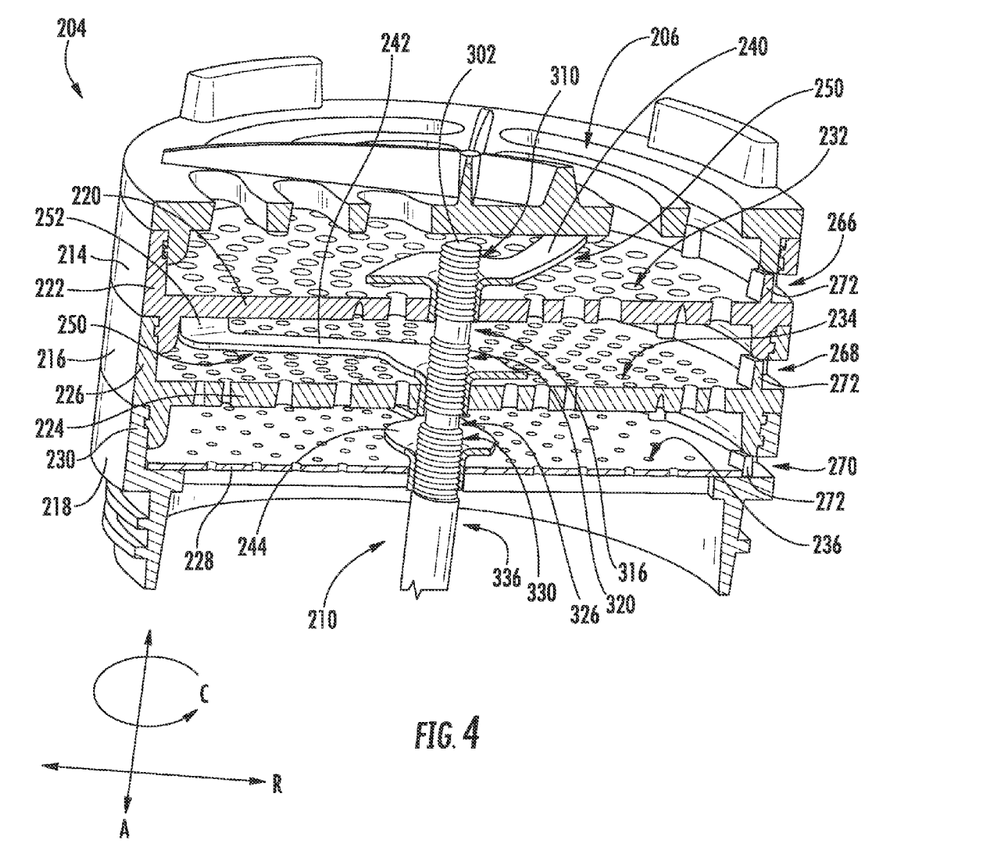
FIG. 4 provides a perspective cross-sectional view of a filter assembly in accordance with one embodiment of the present disclosure.

Reference will now be made to FIGS. 3 and 4. FIG. 3 provides a cross-sectional view of a portion of a sump 200 and circulation pump 202 in accordance with an exemplary embodiment of the present disclosure. Additionally, FIG. 4 provides a cross-sectional and perspective view of a filter assembly 204 in accordance with an exemplary embodiment of the present disclosure. In certain exemplary embodiments, sump 200 and circulation pump 202 may be configured as sump assembly 170 and circulation pump 154 in the exemplary dishwasher appliance 100 of FIGS. 1 and 2.

As is depicted, sump 200 generally includes a filter assembly 204 disposed within sump 200 defining an axial direction A, a radial direction R, and a circumferential direction C. Circulation pump 202 is positioned adjacent to filter assembly 204 and in flow communication with filter assembly 204. Circulation pump 202 is configured to circulate or recirculate water/wash fluid from wash chamber 106 of tub 104. More particularly, circulation pump 202 is configured to urge a flow of wash fluid to be recirculated from wash chamber 106 of dishwasher appliance 100, through an inlet 206 in sump 200, and through filter assembly 204. Inlet 206 of sump 200 may be configured as an opening, e.g., in a bottom wall 142 of tub 104 of dishwashing appliance 100. From filter assembly 204, circulation pump 202 is configured to provide the flow of wash fluid to the tub 104 and wash chamber 106, or more particularly to provide the flow of wash fluid through one or more circulation conduits to one or more spray assemblies, such as spray assemblies 144, 148, 150 depicted in FIG. 2.

Circulation pump 202 generally includes an impeller 208, a shaft 210 (which may also be a shaft of a filter assembly 204 as discussed herein), and an electric motor (not shown). Shaft 210 extends generally along the axial direction A, and is rotatable in the circumferential direction C (i.e., about the axial direction A) by the motor. Impeller 208 is attached to shaft 210 and rotated by shaft 210. Rotation of impeller 208 in the circumferential direction C by shaft 210 generates the flow of wash fluid to be recirculated through filter assembly 204 and into an outlet 212 of circulation pump 202. Outlet 212 of circulation pump 202 may be fluidly connected with the one or more circulation conduits to circulate or recirculate the wash fluid. For example, outlet 212 of circulation pump 202 may provide wash fluid to the one or more spray assemblies, such as spray assemblies 144, 148, 150 depicted in FIG. 2.

For the exemplary embodiment depicted, filter assembly 204 generally includes a plurality of stacked filter members configured in series flow. Accordingly, wash fluid to be recirculated flows sequentially through each of the plurality of filter members prior to being recirculated by circulation pump 202. With such a configuration, all wash fluid circulated or recirculated by circulation pump 202 is filtered by each of the plurality of filter members before reaching the circulation pump 202. Therefore, all wash fluid to be recirculated by circulation pump 202 may be filtered in a "single-pass" through filter assembly 204.

More particularly, for the embodiment depicted, the one or more filter members include a first filter member 214, a second filter member 216, and a third filter member 218. First filter member 214 defines a first filter panel 220 and a first outer wall 222 extending around a perimeter of first filter panel 220. Similarly, second filter member 216 defines a second filter panel 224 and a second outer wall 226 extending around a perimeter of the second filter panel 224, and the third filter member 218 defines a third filter panel 228 with a third outer wall 230 extending around a perimeter of the third filter panel 228.

Additionally, each of the one or more filter members are attached such that the respective filter panels are substantially parallel to one another. For example, the first filter panel 220 is substantially parallel to both second filter panel 224 and third filter panel 228. Moreover, for the embodiment depicted, first outer wall 222 is attached to second outer wall 226 using a screw-type connection, and second outer wall 226 is attached to third outer wall 230 also using a screw-type connection. However, in other embodiments, first, second, and third outer walls 222, 226, 230 may each be attached to one another in any other suitable manner.

Each of first, second, and third filter panels 220, 224, 228 are configured to prevent soils, such as food particles or other debris, greater than a predetermined size for the respective filter panel from passing therethrough. Additionally, each of the plurality of filter members 214, 216, 218 are configured to sequentially filter and remove smaller particles from the wash fluid to be recirculated. More particularly, as is depicted, first filter panel 220 defines a plurality of first filter openings 232, second filter panel 224 defines a plurality of second filter openings 234, and third filter panel 228 defines a plurality of third filter openings 236. First filter openings 232 are larger than second filter openings 234, and second filter openings 234 are larger than third filter openings 236. Accordingly, first filter member 214 may be referred to as a "coarse" filter, second filter member 216 may be referred to as a "medium" filter member, and third filter member 218 may be referred to as a "fine" filter member. Therefore, filter assembly 204 depicted may filter all particles larger than third filter openings 236 from the wash fluid to be recirculated in a single-pass through filter assembly 204.

For the embodiment depicted, each of first filter panel 220, second filter panel 224, and third filter panel 228 are configured as a wall defining first filter openings 232, second filter openings 234, and third filter openings 236, respectively. However, in other exemplary embodiments, first, second, and/or third filter panels 220, 224, 228 may instead be configured to include any other suitable filter medium, such as, e.g., a mesh filter.

Shaft 210 may further extend through the plurality of filter members 214, 216, 218. More particularly, for the embodiment depicted, shaft 210 extends through third filter panel 228 of third filter member 218, through second filter panel 224 of second filter member 216, and through first filter panel 220 of first filter member 214. Filter assembly 204 depicted in FIGS. 3 and 4 further includes discharge blades attached to shaft 210 adjacent to the respective filter panels 220, 224, 228. More particularly, exemplary filter assembly 204 depicted includes a first discharge blade 240, a second discharge blade 242, and a third discharge blade 244. First discharge blade 240 is attached to shaft 210 and positioned adjacent to first filter panel 220; second discharge blade 242 is attached to shaft 210 and is positioned adjacent to the second filter panel 224; and third discharge blade 244 is attached to shaft 210 and positioned adjacent to third filter panel 228.

Each of the exemplary blades 240, 242, 244 includes a pair of arms 251 extending generally outwardly along the radial direction R from shaft 210. Additionally, each of the arms 251 include a lip 252 extending generally along the axial direction A away from the respective filter panels 220, 224, 228 at radially outer ends of the respective arms. Further, lips 252 each define an angle with respect to the radial direction R (see also FIG. 5). For example the angle of the lips 252 relative to the radial direction R may be between about zero degrees and about ninety degrees, such as between about fifteen degrees and about seventy-five degrees, such as between about thirty degrees and about sixty degrees, such as about forty-five degrees. Blades 240, 242, 244 are configured to rotate in the circumferential direction C with shaft 210 and may serve the functions of chopping particles greater than size of the respective filter openings 232, 234, 236 and/or moving particles greater than a size of the respective filter openings 232, 234, 236 outwardly along the radial direction R, as will be discussed below. Moreover, lips 252 may generate an amount of flow of wash fluid outwardly along the radial direction R, as will be discussed below.

Additionally, each blade 240, 242, 244 may define a central bore hole 280, 282, 284 extending therethrough. Shaft 210 may extend through bore holes 280, 282, 284, and blades 240, 242, 244 may be attached to shaft 210 via threaded engagements within bore holes 280, 282, 284 as discussed herein. First blade 240 may, for example, include a plurality of first inner threads 281 which define first bore hole 280. Second blade 242 may, for example, include a plurality of second inner threads 283 which define second bore hole 282. Third blade 244 may, for example, include a plurality of third inner threads 285 which define third bore hole 284. Notably, each thread, as the term is utilized herein, is considered to include one approximately circumferential or helical rotation of a protrusion or depression which meshes and provides threaded engagement with mating threads. A plurality of threads thus may include a plurality of such approximately circumferential or helical rotations of protrusions or depressions which are integral with each other to facilitate meshing and threaded engagement with mating threads.

Referring particularly to FIG. 3, sump 200 includes a housing 254 with a circumferential wall 256 extending around the one or more filter members. More particularly, circumferential wall 256 extends around first, second, and third filter members 214, 216, 218 and defines an annular discharge chamber 258 with first, second, and third filter members 214, 216, 218. More particularly, circumferential wall 256 defines annular discharge chamber 258 with outer walls 222, 226, 230 of the respective filter assemblies 214, 216, 218. Additionally, circumferential wall 256 defines an outlet 260. Outlet 260 is in fluid communication with a drain pump (not shown), such as drain pump 156 depicted in FIG. 2.

Filter members 214, 216, 218 attach to housing 254 of sump 200 below inlet 206 using a screw type connection. However, in other embodiments, the one or more filter members may be attached to housing 254 of sump 200 in any other suitable manner, or alternatively at least one of the one or more filter members may be formed integrally with housing 254 of sump 200. Additionally, filter assembly 204 includes a transition member 262 attached to a filter member, or more particularly attached to third filter member 218.

Transition member 262 makes a connection between the one or more filter members and impeller 208 of circulation pump 202. Accordingly, transition member 262 defines filter assembly outlet 264 whereby filtered wash fluid to be recirculated passes into circulation pump 202.

Figure 5:
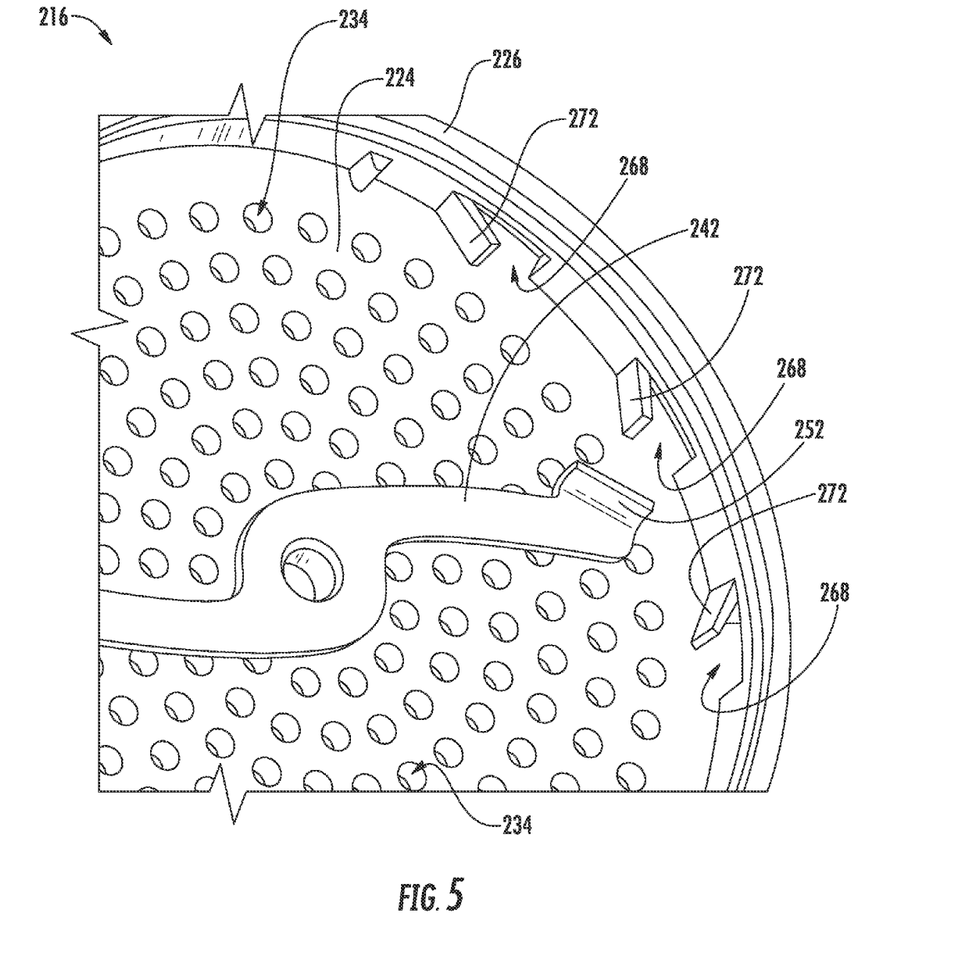
FIG. 5 provides a close-up perspective view of a filter member of a filter assembly in accordance with one embodiment of the present disclosure.

Referring now also to FIG. 5, a close-up perspective view of second filter member 216 is provided. Outer walls 222, 226, 230 of each of the respective filter members 214, 216, 218 define one or more discharge openings that allow for soils to pass from a respective filter panel 220, 224, 228 to annular discharge chamber 258. For example, first outer wall 222 of first filter member 214 defines one or more first discharge openings 266; second outer wall 226 of the second filter member 216 defines one or more second discharge openings 268; and third outer wall 230 of third filter member 218 defines one or more third discharge openings 270. For the embodiment depicted, each filter member 214, 216, 218 further includes guide members 272 slanting inwardly along the radial direction R from the respective outer walls 222, 226, 230 adjacent to each of the respective discharge openings 266, 268, 270. More particularly, the guide members 272 slant towards the discharge openings 264, 266, 268 to guide particles through the discharge openings 264, 266, 268 into the annular discharge chamber 258. As may be more clearly seen in FIG. 5, the guide members 272 each define an angle with regard to the radial direction R. The angle of guide members 272 may be between about ninety degrees and about one hundred and eighty degrees, such as between about one hundred and five degrees and about one hundred and sixty-five degrees, such as between about one hundred and twenty degrees and about one hundred and fifty degrees, such as about one hundred and thirty-five degrees.

During operation of dishwasher appliance 100, or more particularly, during a wash or rinse cycle of dishwasher appliance 100, wash fluid may enter filter assembly 204 through inlet 206 and travel to first filter member 214. The wash fluid may be filtered by first filter panel 220 wherein soils larger than the first filter openings 232 are prevented from flowing therethrough to second filter member 216. At the same time wash fluid and soils smaller than first filter openings 232 may pass therethrough to second filter member 216. The wash fluid may then be filtered by second filter panel 224, wherein soils larger than second filter openings 234 are prevented from flowing therethrough to third filter member 218, while wash fluid and soils smaller than second filter openings 234 may pass therethrough to third filter member 218. The wash fluid may then be filtered by third filter panel 228, wherein soils larger than third filter openings 236 are prevented from flowing to circulation pump 202, while the wash fluid to be recirculated may pass therethrough to circulation pump 202 and be recirculated into tub 104 and wash chamber 106.

Moreover, during operation of the exemplary dishwasher appliance 100, or more particularly during a wash or rinse cycle of the exemplary dishwasher appliance 100, the motor of circulation pump 202 may rotate shaft 210, which in turn may rotate impeller 208 and each of first, second, and third discharge blades 240, 242, 244. The rotation of first, second, and third discharge blades 240, 242, 244 by shaft 210 may allow discharge blades 240, 242, 244 to chop soils greater than the respective first, second, and third filter openings 232, 234, 236 and/or move soils outward along the radial direction R through the respective discharge openings 266, 268, 270. For example, first discharge blade 240 may move soils larger than first filter openings 232 outward along the radial direction R through the one or more first discharge openings 266 and into the annular discharge chamber 258.

Similarly, second discharge blade 242 may move soils larger than second filter openings 234 outward along the radial direction R through the one or more second discharge openings 268 and into annular discharge chamber 258. Further, third discharge blade 244 may move soils larger than third filter openings 236 outward along the radial direction R through the one or more third discharge openings 270 and into annular discharge chamber 258.

The filtered soils along with some accompanying wash fluid may be stored in annular discharge chamber 258 until wash cycle is complete and a discharge cycle is activated. During a discharge cycle, the drain pump is activated and wash fluid is pulled through, e.g., annular discharge chamber 258 and outlet 260 into and through a drain pipe (not shown). The drain pipe may be fluidly connected with a drain or other plumbing configured to dispose of such wash fluid and filtered particles. Notably, in certain embodiments, an appropriate amount of continuous flow of wash fluid, generated by lips 252 of the respective blades 240, 242, 244, may flow with filtered soils into annular discharge chamber 258 and through outlet 260 during a wash and/or rinse cycle of dishwasher appliance 100. In such an embodiment, a length of the drain pipe of the exemplary dishwasher appliance 100 may be filled with filtered/discharged soils and wash fluid (i.e., wash fluid that will not be recirculated). Such a configuration may accommodate storage of the filtered/discharged soils and accompanying wash fluid during a wash and/or rinse cycle of the exemplary dishwasher appliance 100. Additionally, in certain embodiments, the drain pump 156 may be activated for a relatively short period of time during, e.g., a wash or rinse cycle, in order to provide drainage of the wash fluid and filtered/discharged soils prior to a drain cycle.

Dishwasher appliance 100 in accordance with the present disclosure may more effectively and more quickly filter soils from wash fluid. More particularly, a dishwasher appliance 100 including a filter assembly 204 in accordance with the present disclosure may effectively filter all wash fluid to be recirculated in a single-pass. Accordingly, a dishwasher appliance 100 including a filter assembly 204 in accordance with the present disclosure may not be required to include circulation components capable of accommodating particles greater than a maximum size allowed by the fine filter (e.g., third filter member 218). Therefore, such an exemplary dishwasher appliance 100 may include, e.g., smaller nozzles on spray assemblies and/or smaller circulation conduits. This may allow the dishwasher appliance 100 to use less water, operate more efficiently, and include a less powerful circulation pump/motor. Additionally, a wash cycle of a dishwasher appliance 100 including an exemplary filter assembly 204 may run more quickly, as such an exemplary dishwasher appliance 100 need not circulate the wash fluid a multitude of times before all recirculated wash fluid is flowed through a fine filter (e.g., third filter member 218).

Referring now to FIGS. 3, 4 and 6 through 8, in exemplary embodiments, shaft 210 includes various features for attaching blades 240, 242, 244 at desired locations proximately respective filter panels 220, 224, 228 in order that the blades 240, 242, 244 efficiently perform the various functions such as chopping particles and generating wash fluid flow in radially outward directions, as discussed above. Such shafts 210 and the features thereof may advantageously facilitate accurate and repeatable locating of the blades 240, 242, 244, and without the need for additional components added attached to the shafts 210 to facilitate such locating.

In exemplary embodiments, such features may ensure that the blades 240, 242, 244 each define a desired gap 250 along the axial direction A with the respective filter panel 220, 224, 228. For example, in some embodiments, the discharge blades may be located such that the blades define a gap 250 of between about five thousandths of an inch and about fifty thousandths of an inch. In other embodiments, the discharge blades may be located such that the blades define a gap 250 of between about ten thousandths of an inch and about thirty thousandths of an inch. In other embodiments, the discharge blades may be located such that the blades define a gap 250 of between about fifteen thousandths of an inch and about twenty thousandths of an inch. While in some embodiments each of the blades 240, 242, 244 may define an identical gap 250 with first, second, and third panels 220, 224, 228, respectively, in other embodiments each of the blades 240, 242, 244 may define different gaps 250 with first, second, and third panels 220, 224, 228, respectively. It should also be appreciated, that as used herein, terms of approximation, such as "approximately" and "about," refer to being within a ten percent margin of error.

Shaft 210 may, for example, include a body 300 which extends between a first end 302 and a second end 304. The body 300 includes an outer surface 306. Outer surface 306 may define various threaded and unthreaded portions, which may be provided in alternating fashion as shown. These threaded and unthreaded portions may advantageously facilitate improved locating of the blades 240, 242, 244.

Shaft 210 may extend through various components of the filter assembly 204, such as the first filter member 214 (i.e. the first filter panel 220 thereof), second filter member 216 (i.e. the second filter panel 224 thereof), third filter member 218 (i.e. the third filter panel 228 thereof), first central bore hole 280, second central bore hole 282, and third central bore hole 284. Further, as shown, outer surface 306 may include a first threaded portion 310 which may mesh with the first inner threads 281 of the first blade 240. Outer surface 306 may further include a second threaded portion 320 which may mesh with the second inner threads 283 of the second blade 242. Outer surface 306 may further include a third threaded portion 330 which may mesh with the third inner threads 285 of the third blade 244.

Still further, outer surface 306 may further include a fourth threaded portion 340 which may mesh with the fourth inner threads 345 of the impeller 208.

Outer surface 306 may further include a first unthreaded portion 316. The first unthreaded portion 316 may be positioned between and neighboring to the first threaded portion 310 and the second threaded portion 320, such as along a length of the shaft 210. Further, outer surface 306 may include a second unthreaded portion 326. The second unthreaded portion 326 may be positioned neighboring to the second threaded portion 320, such that the second threaded portion 320 is between and neighboring to the first unthreaded portion 316 and the second unthreaded portion 326, such as along the length of the shaft 210. For example, the second unthreaded portion 326 may be positioned between and neighboring to the second threaded portion 320 and the third threaded portion 330, such as along a length of the shaft 210. Further, outer surface 306 may include a third unthreaded portion 336. The third unthreaded portion 336 may be positioned neighboring to the third threaded portion 330, such that the third threaded portion 330 is between and neighboring to the second unthreaded portion 326 and the third unthreaded portion 336, such as along the length of the shaft 210. For example, the third unthreaded portion 336 may be positioned between and neighboring to the third threaded portion 330 and the fourth threaded portion 340, such as along a length of the shaft 210.

Notably, unthreaded portions 316, 326, 336 may be generally smooth, or may have suitable surface features or projections which are generally non-threaded.

Accordingly, the various threaded and unthreaded portion of the outer surface 306 may be provided in alternating fashion along the length of the shaft 210 between the first end 302 and second end 304. Notable, in exemplary embodiments, first threaded portion 310 may include first end 302.

The use of alternating threaded and unthreaded portions may advantageously improve the ability to locate the blades 240, 242, 244 relative to the panels 220, 224, 228 such that gaps 250 are at desired distances. When a blade 240, 242, 244 is threadably engaged with an associated threaded portion of the shaft 210, the blade 240, 242, 244 may only move along the length of the shaft 210 to the intersection of the threaded portion and the neighboring unthreaded portion. At this point, the associated inner threads 281, 283, 285 may no longer have mating threads to mesh with, and may "bottom out" at this intersection. The lengths of the threaded and unthreaded portions may advantageously be configured such that this "bottoming out" occurs at locations wherein the gaps 250 are at desired distances. Further, use of such alternating threaded and unthreaded portions advantageously allows for such locating without the need for additional locating components attached to the shaft 210, and makes such locating relatively more accurate and repeatable. Additionally, assembly of filter assemblies 204 in accordance with the present disclosure is advantageously relatively more efficient and advantageously utilizes fewer components.

The threaded and unthreaded portions may have various diameters relative to each other that further facilitate the advantageous locating of blades 240, 242, 244 as discussed herein. For example, first threaded portion 310 may have a major diameter 312 (corresponding to the diameter of outer threads 311) and a minor diameter 314 (corresponding to outer surface 306 between outer threads 311). First unthreaded portion 316 may have a first outer diameter 318. Second threaded portion 320 may have a major diameter 322 (corresponding to the diameter of outer threads 321) and a minor diameter 324 (corresponding to outer surface 306 between outer threads 321). Second unthreaded portion 326 may have a second outer diameter 328. Third threaded portion 330 may have a major diameter 332 (corresponding to the diameter of outer threads 331) and a minor diameter 334 (corresponding to outer surface 306 between outer threads 331). Third unthreaded portion 336 may have a third outer diameter 338.

Additionally, fourth threaded portion 340 may have a major diameter 342 (corresponding to the diameter of outer threads 341) and a minor diameter 344 (corresponding to outer surface 306 between outer threads 341).

In exemplary embodiments, the first outer diameter 318 may equal the first major diameter 312. Further, the first outer diameter 318 may equal the second minor diameter 324. Still further, the second major diameter 322 may be greater than the first outer diameter 318. In further exemplary embodiments, the second outer diameter 328 may equal the second major diameter 322. Further, the second outer diameter 328 may equal the third minor diameter 334. Still further, the third major diameter 332 may be greater than the second outer diameter 328. In further exemplary embodiments, the third outer diameter 338 may equal the third major diameter 332. Further, the third outer diameter 338 may equal the fourth minor diameter 344. Still further, the fourth major diameter 342 may be greater than the third outer diameter 338.

Accordingly, the diameters of the threaded portions and unthreaded portions generally increase, in a step-wise fashion, along the length of the shaft 210 (such as away from the first end 302). The sizes of the bore holes 280, 282, 284 may correspond to the sizes of the associated threaded portions. This may allow, for example, the third blade 244 to pass over the first and second threaded portions 310, 320 and first and second unthreaded portions 316, 326; and may further allow the second blade 242 to pass over the first threaded portion 310 and first unthreaded portion 316. Notably, the variations in bore hole 280, 282, 284 sizes may additionally advantageously poka yoke the filter assembly 204.

Additionally, in some embodiments, various features of the blades 240, 242, 244 may have different characteristics which correspond to the locations of the blades 240, 242, 244 in the filter assembly 204. For example, the lengths of the arms 251 and/or the overall diameters of the blades 240, 242, 244 may vary. In some embodiments, for example, the lengths of the arms 251 and/or overall diameter of blade 240 may be less than the lengths of the arms 251 and/or overall diameter of blade 242, which in turn may be less than the lengths of the arms 251 and/or overall diameter of blade 244. Additionally or alternatively, the shapes of the arms 251 may vary from blade to blade. Such variations may correspond with variations in bore hole 280, 282, 284 sizes, and may thus further poka yoke the filter assembly 204.

Figure 6:
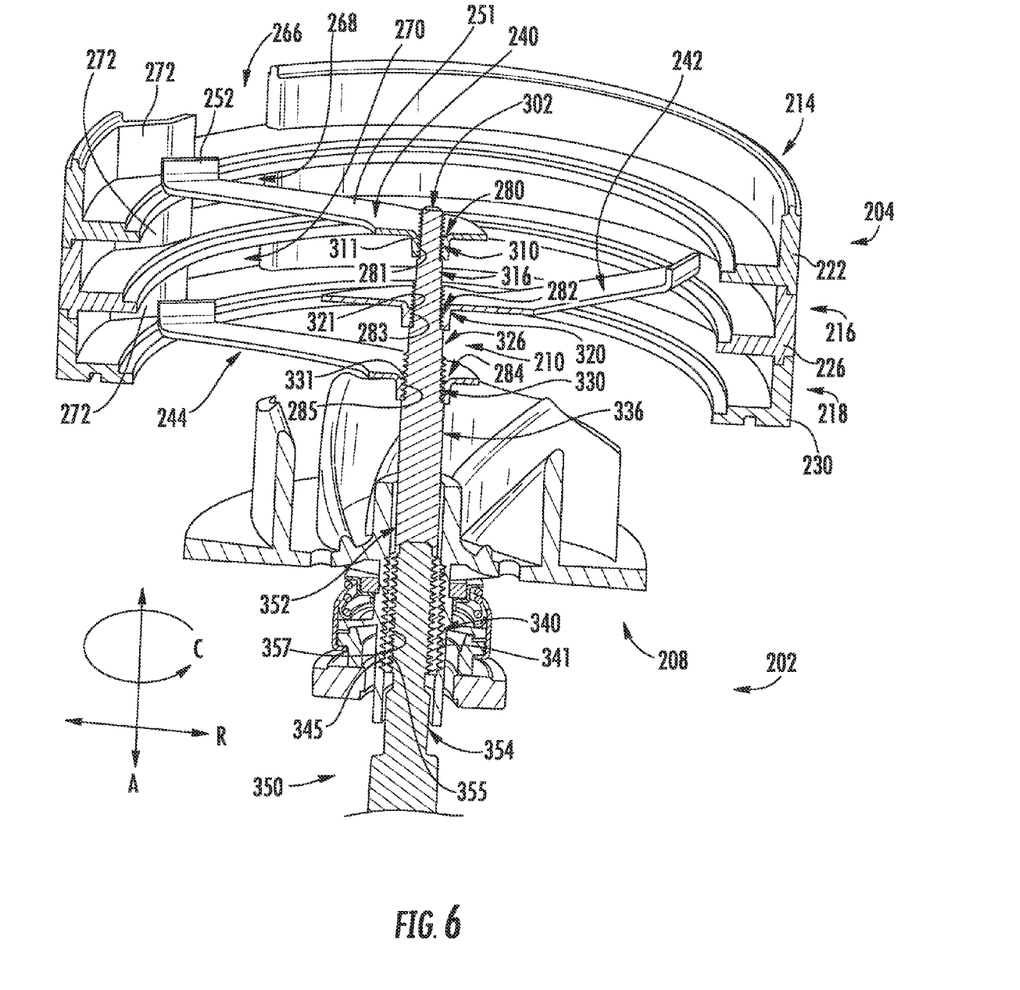
FIG. 6 provides a perspective cross-sectional view of components of a filter assembly and circulation pump, including components of filter members, blades, a shaft, and an impeller, in accordance with one embodiment of the present disclosure.
Figure 7:
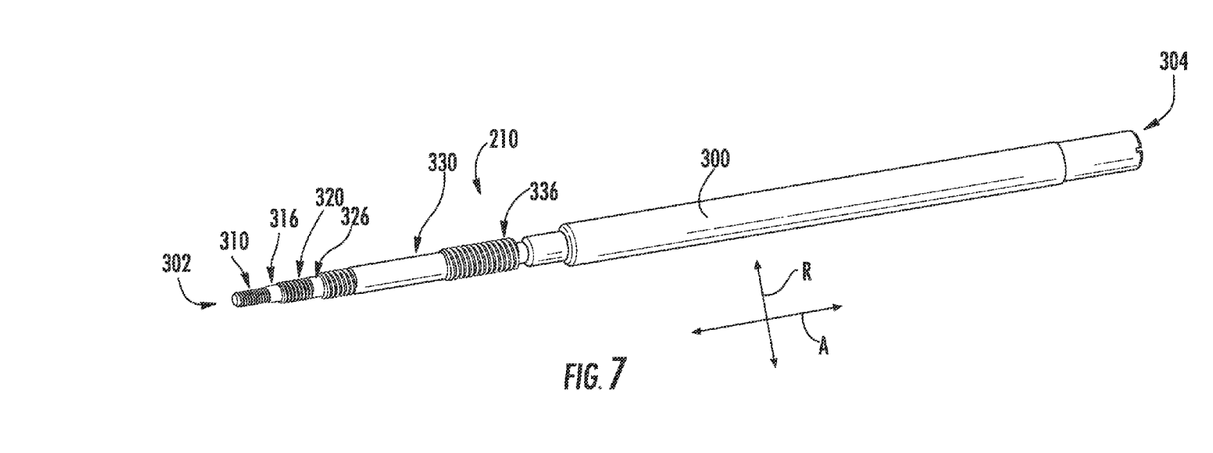
FIG. 7 provides a perspective view of a shaft in accordance with one embodiment of the present disclosure.
Figure 8:
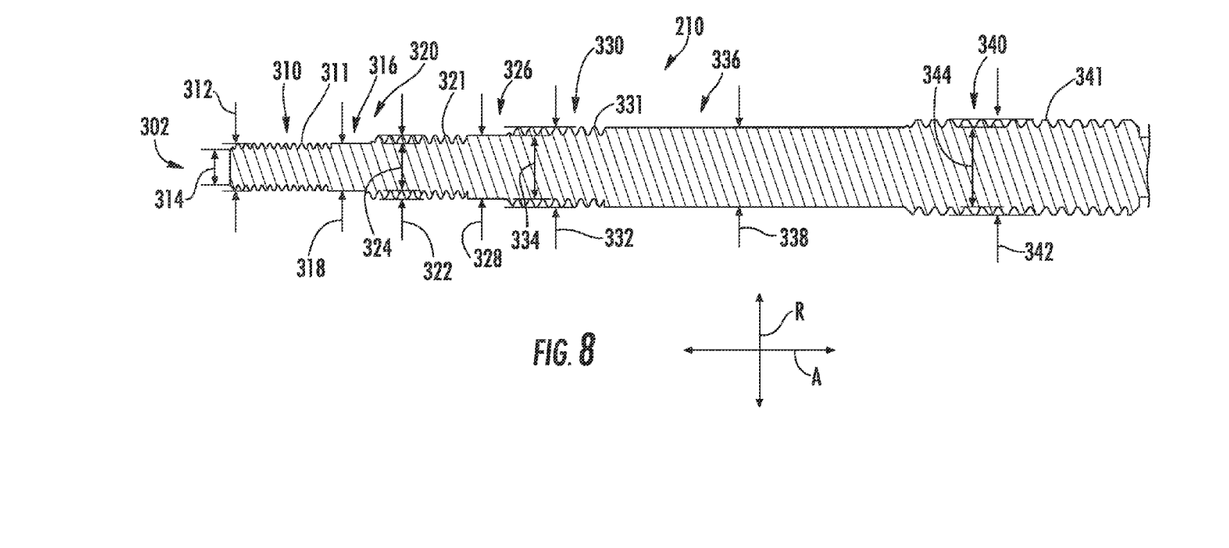
FIG. 8 provides a cross-sectional view of a shaft in accordance with one embodiment of the present disclosure.

In some embodiments, as illustrated in FIGS. 3, 4, 7 and 8, shaft 210 may be a single, integral member which includes threaded portions 310, 320, 330, 340. In other embodiments as illustrated in FIG. 6, the shaft 210 may include two or more portions which are attached together to form the shaft 210. For example, shaft 310 may include a base portion 350 and an extension portion 352. Base portion 250 may include second end 304, and extension portion 352 may include first end 302. The extension portion 352 may include one or more of the threaded and unthreaded portions of the outer surface 306 such as the first threaded portion 310, first unthreaded portion 316, second threaded portion 320, second unthreaded portion 326, third threaded portion 330, third unthreaded portion 336, and/or fourth threaded portion 340. The base portion 350 may in some embodiments not include any of these portions, as shown, or alternatively may include for example fourth threaded portion 340.

To attach base portion 350 and extension portion 352 together, one of the portions 350, 352, such as extension portion 352 as shown, may define a passage 354 and include a plurality of inner threads 355, such as inner extension threads 355 as shown or inner base threads which define the passage 354. The other of the portions 350, 352, such as the base portion 350 as shown, may include a plurality of outer threads 357, such as outer base threads 357 as shown or outer extension threads. These threads 355, 357 may mesh together to attach the base portion 350 and extension portion 352 together to form shaft 210.

It should be appreciated, that the exemplary sump 200 and filter assembly 204 depicted are provided by way of example only, and that in other exemplary embodiments sump 200 and filter assembly 204 may have any other suitable construction or configuration. For example, in other exemplary embodiments, filter assembly 204 may include any suitable number of filter members. For example, in other exemplary embodiments, filter assembly 204 may include at least two filter members, at least four filter members, or at least five filter members. Additionally, although each of the first, second, and third filter panels 220, 224, 228 are depicted extending in respective planes generally perpendicular to the axial direction A, in other embodiments, one or more of the first, second, and third filter panels 220, 224, 228 may have any other suitable shape (e.g., conical, slanted, etc.). Further, in other exemplary embodiments, filter assembly 204 may not include one or more of blades 240, 242, 244, and additionally, or alternatively, filter assembly 204 may include any other suitable configuration for blades 240, 242, 244 (e.g., one or more of the blades may include three or more arms 251, may not include lips 252, etc.). Further, in other embodiments, shaft 210 may have any suitable number of threaded and unthreaded portions, which may alternate and generally correspond to the number of blades 240, 242, 244 and panels 220, 224, 228 as well as impeller 208. Moreover, in other exemplary embodiments, annular discharge chamber 258 may not extend completely around each of the one or more filter members. Instead, in certain exemplary embodiments, annular discharge chamber 258 may be positioned locally adjacent to one or more of first discharge openings 266, second discharge openings 268, and third discharge openings 270.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A filter assembly for filtering a wash fluid to be circulated by a circulation pump in a dishwasher appliance, the filter assembly defining an axial direction and comprising:
   a first filter member including a first filter panel; and
   a second filter member including a second filter panel, the second filter panel spaced from the first filter panel along the axial direction and configured in series flow with the first filter panel such that the wash fluid is filtered by the first filter panel and by the second filter panel prior to being recirculated by the circulation pump;
   a first discharge blade positioned adjacent the first filter panel, the first discharge blade defining a first central bore hole and comprising a plurality of first inner threads that define the first central bore hole;
   a second discharge blade positioned adjacent the second filter panel, the second discharge blade defining a second central bore hole and comprising a plurality of second inner threads that define the second central bore hole; and
   a shaft extending through the first filter member, the second filter member, the first central bore hole and the second central bore hole, the shaft comprising a body which has an outer surface, the outer surface comprising a first threaded portion comprising a first major diameter and a first minor diameter, a second threaded portion comprising a second major diameter and a second minor diameter, a first unthreaded portion between the first threaded portion and the second threaded portion, the first unthreaded portion comprising a first outer diameter equal to the first major diameter and the second minor diameter, and a second unthreaded portion positioned such that the second threaded portion is between the first unthreaded portion and the second unthreaded portion, the second unthreaded portion comprising a second outer diameter equal to the second major diameter;

wherein the plurality of first inner threads mesh with the first threaded portion and the plurality of second inner threads mesh with the second threaded portion.

2. The filter assembly of claim 1, wherein the outer surface further comprises a third threaded portion and a third unthreaded portion, the second unthreaded portion between the second threaded portion and the third threaded portion, the third unthreaded portion positioned such that the third threaded portion is between the second unthreaded portion and the third unthreaded portion.

3. The filter assembly of claim 2, further comprising:
a third filter member including a third filter panel, the third filter panel spaced from the second filter panel along the axial direction and configured in series flow with the second filter panel such that the wash fluid is filtered by the second filter panel and by the third filter panel prior to being recirculated by the circulation pump; and
a third discharge blade positioned adjacent the third filter panel, the third discharge blade defining a third central bore hole and comprising a plurality of third inner threads that define the third central bore hole,
wherein the plurality of third inner threads mesh with the third threaded portion.

4. The filter assembly of claim 2, wherein the third threaded portion comprises a third major diameter and a third minor diameter and the third unthreaded portion comprises a third outer diameter, and wherein the third outer diameter equals the third major diameter.

5. The filter assembly of claim 2, wherein the second unthreaded portion comprises a second outer diameter and the third threaded portion comprises a third major diameter and a third minor diameter, and wherein the second outer diameter equals the third minor diameter.

6. The filter assembly of claim 2, wherein the second unthreaded portion comprises a second outer diameter and the third threaded portion comprises a third major diameter and a third minor diameter, and wherein the third major diameter is greater than the second outer diameter.

7. The filter assembly of claim 2, wherein the outer surface further comprises a fourth threaded portion, the third unthreaded portion between the third threaded portion and the fourth threaded portion.

8. The filter assembly of claim 7, wherein the first filter panel defines a plurality of first filter opening, wherein the second filter panel defines a plurality of second filter openings, and wherein the first filter openings are larger than the second filter openings.

9. The filter assembly of claim 1, wherein the first filter member includes a first outer wall extending around a perimeter of the first filter panel, wherein the second filter member includes a second outer wall extending around a perimeter of the second filter member.

10. The filter assembly of claim 9, wherein the first outer wall defines one or more first discharge openings, wherein the second outer wall defines one or more second discharge openings, wherein the one or more first discharge openings allow for particles to pass from the first filter panel to an annular discharge chamber, and wherein the one or more second discharge openings allow for particles to pass from the second filter panel to the annular discharge chamber.

11. A dishwasher appliance defining a vertical direction, the dishwasher appliance comprising:

a tub defining a wash chamber;
a sump positioned at a bottom portion of the tub along the vertical direction;
a circulation pump for circulating a wash fluid in the sump to the wash chamber; and
a filter assembly disposed within the sump and in flow communication with the circulation pump, the filter assembly defining an axial direction and comprising:
a first filter member including a first filter panel; and
a second filter member including a second filter panel, the second filter panel spaced from the first filter panel along the axial direction and configured in series flow with the first filter panel such that the wash fluid is filtered by the first filter panel and by the second filter panel prior to being recirculated by the circulation pump;
a first discharge blade positioned adjacent the first filter panel, the first discharge blade defining a first central bore hole and comprising a plurality of first inner threads that define the first central bore hole;
a second discharge blade positioned adjacent the second filter panel, the second discharge blade defining a second central bore hole and comprising a plurality of second inner threads that define the second central bore hole; and
a shaft extending through the first filter member, the second filter member, the first central bore hole and the second central bore hole, the shaft comprising a body which has an outer surface, the outer surface comprising a first threaded portion comprising a first major diameter and a first minor diameter, a second threaded portion comprising a second major diameter and a second minor diameter, a first unthreaded portion between the first threaded portion and the second threaded portion, the first unthreaded portion comprising a first outer diameter equal to the first major diameter and the second minor diameter, and a second unthreaded portion positioned such that the second threaded portion is between the first unthreaded portion and the second unthreaded portion,
wherein the plurality of first inner threads mesh with the first threaded portion and the plurality of second inner threads mesh with the second threaded portion.

12. The dishwasher appliance of claim 11, wherein the outer surface further comprises a third threaded portion and a third unthreaded portion, the second unthreaded portion between the second threaded portion and the third threaded portion, the third unthreaded portion positioned such that the third threaded portion is between the second unthreaded portion and the third unthreaded portion.

13. The dishwasher appliance of claim 11, wherein the outer surface further comprises a fourth threaded portion, and wherein the circulation pump includes an impeller, and wherein a plurality of fourth inner threads of the impeller mesh with the fourth threaded portion.

14. The dishwasher appliance of claim 11, wherein the shaft comprises a base section and an extension section, the extension section comprising the first threaded portion, the second threaded portion, the first unthreaded portion, and the second unthreaded portion, the extension section further defining a passage and comprising a plurality of inner extension threads, the base section comprising a plurality of outer base threads that mesh with the plurality of inner extension threads to attach the base portion to the extension portion.

* * * * *